US010952928B2

(12) United States Patent
Paz

(10) Patent No.: US 10,952,928 B2
(45) Date of Patent: Mar. 23, 2021

(54) MEDICATION DISPENSER DEPILLING MECHANISM

(71) Applicant: DOSENTRX LTD., Bet Shemesh (IL)

(72) Inventor: Ilan Paz, Alon Shvut (IL)

(73) Assignee: Dosentrix Ltd., Bet Shemesh (IL)

( * ) Notice: Subject to any disclaimer, the term of this patent is extended or adjusted under 35 U.S.C. 154(b) by 581 days.

(21) Appl. No.: 15/568,132

(22) PCT Filed: Apr. 14, 2016

(86) PCT No.: PCT/IL2016/050398
§ 371 (c)(1),
(2) Date: Feb. 22, 2018

(87) PCT Pub. No.: WO2016/170526
PCT Pub. Date: Oct. 27, 2016

(65) Prior Publication Data
US 2018/0078460 A1    Mar. 22, 2018

(30) Foreign Application Priority Data

Apr. 20, 2015   (IL) .......................................... 238387

(51) Int. Cl.
*A61J 7/00* (2006.01)
*A61J 1/03* (2006.01)
(Continued)

(52) U.S. Cl.
CPC ............. *A61J 7/0076* (2013.01); *A61J 1/035* (2013.01); *A61J 7/0015* (2013.01); *B32B 3/26* (2013.01);
(Continued)

(58) Field of Classification Search
CPC ........ A61J 1/035; A61J 7/0015; A61J 7/0076; B32B 15/08; B32B 3/26; B32B 27/06;
(Continued)

(56) References Cited

U.S. PATENT DOCUMENTS

| 38,343 A | 4/1863 | Tower et al. |
|---|---|---|
| 708,216 A | 9/1902 | Fowler, Jr. |

(Continued)

FOREIGN PATENT DOCUMENTS

| CA | 2691725 | 7/2011 |
|---|---|---|
| CN | 1193945 | 9/1998 |

(Continued)

*Primary Examiner* — Glenn F Myers
(74) *Attorney, Agent, or Firm* — Stoel Rives LLP; Kelly A. Echols

(57) ABSTRACT

The present invention provides a depilling device for a blister package comprising at least one array of dosage forms to be dispensed, wherein each dosage form is contained within a blister formed as a covered cavity bounded by a backing, said device comprising a double action depilling mechanism, comprising a first pusher, sized and adapted to engage a top surface of said covered cavity and to exert a first sufficient force thereagainst so as to push said dosage form contained therein against its respective bounding backing, and a second pusher sized and adapted to more forcibly engage said top surface of said covered cavity and to exert a second sufficient force thereagainst so as to expel said dosage form from said blister.

19 Claims, 8 Drawing Sheets

(51) Int. Cl.
*B32B 3/26* (2006.01)
*B65D 75/32* (2006.01)
*B65D 83/04* (2006.01)

(52) U.S. Cl.
CPC ....... *B65D 75/327* (2013.01); *B65D 83/0463* (2013.01)

(58) Field of Classification Search
CPC .......... B32B 2307/58; B32B 2307/546; B32B 2553/026; B65D 83/0463; B65D 83/00; B65D 75/327; B62B 1/00; B65B 69/0058; B65B 69/0033; B65B 69/0041; F42B 39/10
USPC ........................................................ 414/412
See application file for complete search history.

(56) References Cited

U.S. PATENT DOCUMENTS

| | | | |
|---|---|---|---|
| 1,187,634 | A | 6/1916 | Lorimer et al. |
| 2,004,243 | A | 6/1935 | Hloch |
| 2,470,298 | A | 5/1949 | Fields |
| 2,510,712 | A | 6/1950 | Olowinski |
| 2,526,749 | A | 10/1950 | Hokanson |
| 2,694,641 | A | 11/1954 | Atwood |
| 2,740,558 | A | 4/1956 | Steele |
| 2,963,200 | A | 12/1960 | Miller |
| 3,150,639 | A | 9/1964 | Sereda |
| 3,270,918 | A | 9/1966 | Burch et al. |
| 3,437,194 | A | 4/1969 | Ames et al. |
| RE26,589 | E | 5/1969 | Murov et al. |
| 3,505,737 | A | 4/1970 | Merolla |
| 3,923,060 | A | 12/1975 | Ellinwood, Jr. |
| 4,106,698 | A | 8/1978 | Lin |
| 4,114,965 | A | 9/1978 | Oye et al. |
| 4,428,709 | A * | 1/1984 | Peters ................ B65B 69/0058 128/203.15 |
| 4,604,847 | A * | 8/1986 | Moulding, Jr. ....... A61J 7/0084 128/203.15 |
| 4,695,954 | A | 9/1987 | Rose et al. |
| 4,839,806 | A | 6/1989 | Goldfischer et al. |
| 4,872,591 | A | 10/1989 | Konopka |
| 4,887,594 | A | 12/1989 | Siegel |
| 4,918,690 | A | 4/1990 | Markkula, Jr. |
| 4,998,623 | A | 3/1991 | Doull |
| 5,014,040 | A | 5/1991 | Weaver et al. |
| 5,019,125 | A * | 5/1991 | Rebne ................ B65D 83/0463 206/528 |
| 5,049,125 | A | 9/1991 | Accaries et al. |
| 5,110,008 | A | 5/1992 | Moulding et al. |
| 5,163,426 | A | 11/1992 | Czeisler et al. |
| 5,176,133 | A | 1/1993 | Czeisler et al. |
| 5,219,093 | A | 6/1993 | Moulding et al. |
| 5,344,043 | A | 9/1994 | Moulding et al. |
| 5,348,158 | A * | 9/1994 | Honan .................... A61J 1/035 206/531 |
| 5,431,299 | A | 7/1995 | Brewer et al. |
| 5,460,299 | A | 10/1995 | Prause |
| 5,475,687 | A | 12/1995 | Markkula, Jr. et al. |
| 5,490,610 | A | 2/1996 | Pearson |
| 5,524,073 | A | 6/1996 | Stambler |
| 5,562,232 | A | 10/1996 | Pearson |
| 5,844,888 | A | 12/1998 | Markkula, Jr. |
| 5,850,937 | A | 12/1998 | Rauche |
| 5,853,244 | A | 12/1998 | Hoff et al. |
| 5,955,952 | A | 9/1999 | Bergman et al. |
| 6,021,918 | A | 2/2000 | Dumont et al. |
| 6,024,247 | A | 2/2000 | Birr |
| 6,032,155 | A | 2/2000 | De La |
| 6,048,271 | A | 4/2000 | Barcelou |
| 6,068,126 | A | 5/2000 | Dejonge |
| 6,145,697 | A | 11/2000 | Gudish |
| 6,150,942 | A | 11/2000 | O'Brien et al. |
| 6,152,364 | A | 11/2000 | Schoonen et al. |
| 6,163,736 | A | 12/2000 | Halfacre |
| 6,219,587 | B1 | 4/2001 | Arlin et al. |
| 6,234,343 | B1 * | 5/2001 | Papp .................. B65D 83/0454 221/197 |
| 6,263,259 | B1 | 7/2001 | Bartur |
| 6,304,797 | B1 | 10/2001 | Shusterman |
| 6,318,051 | B1 | 11/2001 | Preiss |
| 6,327,570 | B1 | 12/2001 | Stevens |
| 6,352,200 | B1 | 3/2002 | Schoonen et al. |
| 6,415,202 | B1 | 7/2002 | Halfacre |
| 6,529,446 | B1 | 3/2003 | De La Huerga |
| 6,579,231 | B1 | 6/2003 | Phipps |
| 6,601,729 | B1 | 8/2003 | Papp |
| 6,604,019 | B2 | 8/2003 | Ahlin et al. |
| 6,611,733 | B1 | 8/2003 | De La |
| 6,729,327 | B2 | 5/2004 | McFarland, Jr. et al. |
| 6,766,219 | B1 | 7/2004 | Hasey |
| 6,776,304 | B2 | 8/2004 | Liff et al. |
| 6,814,255 | B2 | 11/2004 | Liff et al. |
| 6,848,593 | B2 | 2/2005 | Papp |
| 6,892,941 | B2 | 5/2005 | Rosenblum |
| 6,922,664 | B1 | 7/2005 | Fernandez et al. |
| 6,947,900 | B2 | 9/2005 | Giordano, III et al. |
| 6,988,634 | B2 | 1/2006 | Varis |
| 7,006,894 | B2 | 2/2006 | De La |
| 7,030,823 | B2 | 4/2006 | Apotheloz et al. |
| 7,044,302 | B2 | 5/2006 | Conley |
| 7,051,898 | B1 | 5/2006 | Connell |
| 7,084,946 | B2 | 8/2006 | Ota et al. |
| 7,178,688 | B2 | 2/2007 | Naufel et al. |
| 7,216,776 | B2 | 5/2007 | Gelardi |
| 7,216,802 | B1 | 5/2007 | De La Huerga |
| 7,231,920 | B2 | 6/2007 | Harvey et al. |
| 7,302,311 | B2 | 11/2007 | Varis |
| 7,359,765 | B2 | 4/2008 | Varvarelis et al. |
| 7,426,475 | B1 | 9/2008 | Tangellapally et al. |
| 7,451,761 | B2 | 11/2008 | Hickey et al. |
| 7,491,219 | B2 | 2/2009 | Steinberg |
| 7,503,081 | B2 | 3/2009 | Montgomery |
| 7,562,790 | B2 | 7/2009 | Wheeler et al. |
| 7,624,733 | B2 | 12/2009 | Riley et al. |
| 7,624,894 | B2 | 12/2009 | Gerold et al. |
| 7,637,079 | B2 | 12/2009 | Klingel et al. |
| 7,654,261 | B1 | 2/2010 | Rockhold |
| 7,665,811 | B2 | 2/2010 | Johanning |
| 7,677,941 | B2 | 3/2010 | Koyama |
| 7,692,195 | B2 | 4/2010 | Namose |
| 7,704,236 | B2 | 4/2010 | Denolly |
| 7,727,469 | B2 | 6/2010 | Takahashi et al. |
| 7,743,923 | B2 | 6/2010 | Conley |
| 7,766,365 | B2 | 8/2010 | Darling, III |
| 7,771,984 | B2 | 8/2010 | Dzekunov et al. |
| 7,787,986 | B2 | 8/2010 | Pinney et al. |
| 7,828,147 | B2 | 11/2010 | Caracciolo et al. |
| 7,844,362 | B2 | 11/2010 | Handfield et al. |
| 7,860,724 | B2 | 12/2010 | Chudy et al. |
| 7,865,263 | B2 | 1/2011 | Spano, Jr. et al. |
| 7,885,725 | B2 | 2/2011 | Dunn |
| 7,896,192 | B2 | 3/2011 | Conley et al. |
| 7,930,056 | B2 | 4/2011 | Fernandez |
| 7,932,832 | B2 | 4/2011 | Hayashi |
| 7,934,355 | B2 | 5/2011 | Strub et al. |
| 7,946,483 | B2 | 5/2011 | Miller et al. |
| 7,978,083 | B2 | 7/2011 | Melker et al. |
| 7,988,016 | B2 | 8/2011 | Klein et al. |
| 7,996,106 | B2 | 8/2011 | Ervin |
| 7,999,987 | B2 | 8/2011 | Namose |
| 8,006,903 | B2 | 8/2011 | Braun |
| 8,015,417 | B2 | 9/2011 | Kato et al. |
| 8,027,748 | B2 | 9/2011 | Handfield et al. |
| 8,032,397 | B2 | 10/2011 | Lawless |
| 8,065,035 | B2 | 11/2011 | Ross et al. |
| 8,073,563 | B2 | 12/2011 | Vahlberg et al. |
| 8,090,473 | B2 | 1/2012 | Higham |
| 8,103,346 | B2 | 1/2012 | Mass et al. |
| 8,103,379 | B2 | 1/2012 | Biba et al. |
| 8,112,942 | B2 | 2/2012 | Bohm et al. |
| 8,118,222 | B2 | 2/2012 | Barcelou |
| 8,126,590 | B2 | 2/2012 | Vahlberg et al. |

(56) References Cited

U.S. PATENT DOCUMENTS

| | | |
|---|---|---|
| 8,135,497 B2 | 3/2012 | Joslyn |
| 8,140,186 B2 | 3/2012 | Vahlberg et al. |
| 8,145,353 B1 | 3/2012 | Cotner |
| 8,162,690 B2 | 4/2012 | Smith |
| 8,195,329 B2 | 6/2012 | Pinney et al. |
| 8,265,757 B2 | 9/2012 | Mass et al. |
| 8,266,447 B2 | 9/2012 | Völkening et al. |
| 8,280,550 B2 | 10/2012 | Levy et al. |
| 8,343,434 B2 | 1/2013 | Hyde et al. |
| 8,390,761 B2 | 3/2013 | Oda |
| 8,395,314 B2 | 3/2013 | Yamamoto et al. |
| 8,417,378 B2 | 4/2013 | Joslyn |
| 8,468,031 B2 | 6/2013 | Jung et al. |
| 8,478,604 B2 | 7/2013 | Henderson et al. |
| 8,494,878 B2 | 7/2013 | Stevens |
| 8,504,197 B2 | 8/2013 | Farr |
| 8,554,365 B2 | 10/2013 | Thomas et al. |
| 8,587,427 B2 | 11/2013 | Lalonde et al. |
| 8,615,971 B2 | 12/2013 | Freudelsperger |
| 8,626,342 B2 | 1/2014 | Williams |
| 8,672,879 B2 | 3/2014 | Grant et al. |
| 8,725,291 B2 | 5/2014 | Czaja et al. |
| 8,787,555 B2 | 7/2014 | Gonen et al. |
| 8,926,526 B2 | 1/2015 | Shuck |
| 8,930,207 B2 | 1/2015 | Keravich et al. |
| 8,954,190 B2 | 2/2015 | Braunstein |
| 9,014,847 B2 | 4/2015 | Dunn |
| 9,031,690 B2 | 5/2015 | Cotner |
| 9,037,616 B2 | 5/2015 | Bessette |
| 9,043,012 B2 | 5/2015 | Davey et al. |
| 9,098,983 B2 | 8/2015 | Rahilly |
| 9,101,531 B1 | 8/2015 | Song |
| 9,107,571 B2 | 8/2015 | Strauss et al. |
| 9,111,408 B2 | 8/2015 | Biba et al. |
| 9,185,501 B2 | 11/2015 | Pai |
| 9,211,498 B2 | 12/2015 | Akdogan et al. |
| 9,235,689 B2 | 1/2016 | Ervin |
| 9,242,043 B2 | 1/2016 | Ludolph |
| 9,245,305 B2 | 1/2016 | Wellington et al. |
| 9,358,499 B2 | 6/2016 | Akdogan et al. |
| 9,358,500 B2 | 6/2016 | Akdogan et al. |
| 9,361,748 B2 | 6/2016 | Cunningham et al. |
| 9,381,311 B2 | 7/2016 | Holakovsky et al. |
| 9,387,153 B1 | 7/2016 | Mazur |
| 9,400,873 B2 | 7/2016 | Kamen et al. |
| 9,443,062 B2 | 9/2016 | Long et al. |
| 9,463,412 B2 | 10/2016 | Akdogan et al. |
| 9,465,919 B2 | 10/2016 | Kamen et al. |
| 9,508,935 B2 | 11/2016 | Watanabe |
| 9,550,031 B2 | 1/2017 | Van Sickle et al. |
| 9,561,324 B2 | 2/2017 | Estes |
| 9,600,635 B2 | 3/2017 | Czaja |
| 9,665,689 B2 | 5/2017 | O'Brien et al. |
| 9,675,523 B2 | 6/2017 | Ducatt et al. |
| 9,707,358 B2 | 7/2017 | Eggert et al. |
| 9,730,005 B2 | 8/2017 | Pai |
| 2001/0028308 A1* | 10/2001 | De La Huerga .. A61M 5/14212 340/573.1 |
| 2002/0026332 A1 | 2/2002 | Snowden et al. |
| 2002/0034978 A1 | 3/2002 | Legge et al. |
| 2002/0088825 A1 | 7/2002 | Laverdure |
| 2002/0165641 A1 | 11/2002 | Manalang et al. |
| 2003/0029880 A1 | 2/2003 | Hunts |
| 2003/0042167 A1 | 3/2003 | Balz et al. |
| 2003/0115082 A1 | 6/2003 | Jacobsen et al. |
| 2003/0216625 A1 | 11/2003 | Phipps |
| 2004/0019502 A1 | 1/2004 | Leaman |
| 2004/0045858 A1 | 3/2004 | Harrold |
| 2004/0073454 A1 | 4/2004 | Urquhart et al. |
| 2004/0077937 A1 | 4/2004 | Yarden |
| 2004/0139000 A1 | 7/2004 | Amos |
| 2004/0158350 A1 | 8/2004 | Ostergaard et al. |
| 2004/0158507 A1 | 8/2004 | Meek et al. |
| 2004/0244794 A1 | 12/2004 | Richards |
| 2004/0249250 A1 | 12/2004 | McGee et al. |
| 2005/0043965 A1 | 2/2005 | Heller et al. |
| 2005/0211768 A1 | 9/2005 | Stillman |
| 2006/0104765 A1 | 5/2006 | Yuyama |
| 2006/0125356 A1 | 6/2006 | Meek, Jr. et al. |
| 2006/0154642 A1 | 7/2006 | Scannell, Jr. |
| 2006/0184524 A1 | 8/2006 | Pollanz |
| 2006/0194075 A1 | 8/2006 | Miyamoto et al. |
| 2006/0204922 A1 | 9/2006 | Anderson et al. |
| 2007/0042488 A1 | 2/2007 | Bornemann |
| 2007/0051072 A1 | 3/2007 | Lai |
| 2007/0104731 A1 | 5/2007 | Kelleher et al. |
| 2007/0185614 A1 | 8/2007 | Bain |
| 2007/0197978 A1 | 8/2007 | Wortham |
| 2007/0213877 A1 | 9/2007 | Hart et al. |
| 2007/0222554 A1 | 9/2007 | Hart |
| 2007/0261985 A1 | 11/2007 | Allen |
| 2008/0004507 A1 | 1/2008 | Williams et al. |
| 2008/0035520 A1 | 2/2008 | Caracciolo et al. |
| 2008/0164275 A1 | 7/2008 | Poutiatine et al. |
| 2008/0189173 A1 | 8/2008 | Bakar et al. |
| 2008/0251551 A1 | 10/2008 | Huber et al. |
| 2008/0257904 A1 | 10/2008 | Schiff |
| 2008/0283542 A1 | 11/2008 | Lanka et al. |
| 2009/0024248 A1 | 1/2009 | Hodson |
| 2009/0055223 A1 | 2/2009 | Jung et al. |
| 2009/0073356 A1 | 3/2009 | Moriyama et al. |
| 2009/0079335 A1 | 3/2009 | Mitsuya et al. |
| 2009/0134368 A1 | 5/2009 | Shibatani et al. |
| 2009/0135120 A1 | 5/2009 | Shibatani |
| 2009/0135349 A1 | 5/2009 | Shibatani et al. |
| 2009/0152514 A1 | 6/2009 | Takiguchi et al. |
| 2009/0152516 A1 | 6/2009 | Shibatani et al. |
| 2009/0152518 A1 | 6/2009 | Takiguchi et al. |
| 2009/0185114 A1 | 7/2009 | Takiguchi |
| 2009/0189128 A1 | 7/2009 | Takiguchi et al. |
| 2009/0230164 A1 | 9/2009 | Freeman |
| 2009/0240528 A1 | 9/2009 | Bluth |
| 2009/0250485 A1 | 10/2009 | Klingel |
| 2009/0302048 A1 | 12/2009 | Nobilet et al. |
| 2010/0005445 A1 | 1/2010 | Argue et al. |
| 2010/0016746 A1 | 1/2010 | Hampton et al. |
| 2010/0041056 A1 | 2/2010 | Kinnon et al. |
| 2010/0193536 A1* | 8/2010 | Benktzon ............ B65D 83/0463 221/1 |
| 2010/0205009 A1 | 8/2010 | Kostoff |
| 2010/0237338 A1 | 9/2010 | Yamamoto et al. |
| 2010/0250697 A1 | 9/2010 | Hansen et al. |
| 2010/0294927 A1 | 11/2010 | Nelson et al. |
| 2010/0312137 A1 | 12/2010 | Gilmour et al. |
| 2011/0014351 A1 | 1/2011 | Reider et al. |
| 2011/0130635 A1 | 6/2011 | Ross |
| 2011/0173028 A1 | 7/2011 | Bond |
| 2011/0190635 A1 | 8/2011 | Bosler |
| 2011/0270442 A1 | 11/2011 | Conley et al. |
| 2012/0003928 A1 | 1/2012 | Geboers |
| 2012/0066097 A1 | 3/2012 | Amos |
| 2013/0018356 A1 | 1/2013 | Prince |
| 2013/0046276 A1 | 2/2013 | Mernoe et al. |
| 2013/0070090 A1 | 3/2013 | Bufalini et al. |
| 2013/0090744 A1 | 4/2013 | Tran |
| 2013/0104284 A1 | 5/2013 | Kantrowitz et al. |
| 2013/0173302 A1 | 7/2013 | Hyde et al. |
| 2013/0231954 A1 | 9/2013 | Bryant |
| 2013/0234855 A1 | 9/2013 | Knighton |
| 2013/0290115 A1 | 10/2013 | Leoni et al. |
| 2013/0297068 A1 | 11/2013 | Marshall |
| 2013/0310664 A1 | 11/2013 | Kozloski et al. |
| 2013/0317835 A1 | 11/2013 | Mathew |
| 2014/0177825 A1 | 6/2014 | Mattsson et al. |
| 2014/0241838 A1 | 8/2014 | Beck et al. |
| 2014/0241839 A1 | 8/2014 | Beck et al. |
| 2014/0244033 A1 | 8/2014 | Ucer et al. |
| 2014/0277136 A1 | 9/2014 | Stein |
| 2014/0320289 A1 | 10/2014 | Raichman |
| 2015/0057574 A1 | 2/2015 | Baym et al. |
| 2015/0058041 A1 | 2/2015 | Ervin |
| 2015/0081330 A1 | 3/2015 | Mann et al. |
| 2015/0083742 A1 | 3/2015 | Choi et al. |
| 2015/0148943 A1 | 5/2015 | Sullivan |

(56) References Cited

U.S. PATENT DOCUMENTS

| | | |
|---|---|---|
| 2015/0191294 A1 | 7/2015 | Paz |
| 2015/0374441 A1 | 12/2015 | MacHado et al. |
| 2016/0012445 A1 | 1/2016 | Villa-Real |
| 2016/0066855 A1 | 3/2016 | Hyde et al. |
| 2016/0089303 A1 | 3/2016 | Latorraca et al. |
| 2016/0089491 A1 | 3/2016 | Smith |
| 2016/0158465 A1 | 6/2016 | Coats et al. |
| 2016/0210439 A1 | 7/2016 | Hartlaub et al. |
| 2016/0259183 A1 | 9/2016 | Rayner |
| 2016/0267229 A1 | 9/2016 | High et al. |
| 2016/0283691 A1 | 9/2016 | Ali |
| 2016/0314272 A1 | 10/2016 | Braustein |
| 2016/0346056 A1 | 12/2016 | Demers et al. |
| 2016/0350500 A1 | 12/2016 | Benja-Athon |
| 2016/0354284 A1 | 12/2016 | Liou et al. |
| 2016/0367188 A1 | 12/2016 | Malik et al. |
| 2016/0367421 A1 | 12/2016 | Ead |
| 2016/0374902 A1 | 12/2016 | Govindasamy |
| 2017/0020785 A1 | 1/2017 | McCullough |
| 2017/0032092 A1 | 2/2017 | Mink et al. |
| 2017/0043896 A1 | 2/2017 | Fernandez |
| 2017/0231870 A1 | 8/2017 | Stachler et al. |

FOREIGN PATENT DOCUMENTS

| | | |
|---|---|---|
| CN | 1639028 | 7/2005 |
| CN | 101309841 | 11/2008 |
| CN | 205257030 | 5/2016 |
| EP | 0547426 | 6/1993 |
| EP | 0629554 | 12/1994 |
| EP | 1721596 B1 | 12/2009 |
| EP | 2301850 | 3/2011 |
| JP | 2006052019 A | 2/2006 |
| JP | 2012139317 | 8/2012 |
| WO | 1992020455 A1 | 11/1992 |
| WO | 1996013790 A1 | 5/1996 |
| WO | 199708078 A1 | 3/1997 |
| WO | 199910830 A1 | 3/1999 |
| WO | 200043287 | 7/2000 |
| WO | 2000064754 A1 | 11/2000 |
| WO | 2001067345 A1 | 9/2001 |
| WO | 2001076460 A2 | 10/2001 |
| WO | 2002071955 A2 | 9/2002 |
| WO | 2002095645 A1 | 11/2002 |
| WO | 2003015838 A2 | 2/2003 |
| WO | 2003040686 A2 | 5/2003 |
| WO | 2003046695 A2 | 6/2003 |
| WO | 2005109119 A1 | 11/2005 |
| WO | 2007070570 A2 | 6/2007 |
| WO | 2009036316 A1 | 3/2009 |
| WO | 2010008377 A1 | 1/2010 |
| WO | 2011002319 A2 | 1/2011 |
| WO | 2011055040 A1 | 5/2011 |
| WO | 2011151056 A1 | 12/2011 |
| WO | 2012040528 A1 | 3/2012 |
| WO | 2012066580 A2 | 5/2012 |
| WO | 2012069896 A1 | 5/2012 |
| WO | 2012098248 A2 | 7/2012 |
| WO | 2012098249 A1 | 7/2012 |
| WO | 2014059310 A2 | 4/2014 |
| WO | 2014144548 A2 | 9/2014 |
| WO | 2015016375 A1 | 2/2015 |
| WO | 2015113149 A1 | 8/2015 |
| WO | 2015117049 A2 | 8/2015 |
| WO | 2015196293 A1 | 12/2015 |
| WO | 2016030902 A1 | 3/2016 |
| WO | 2016036566 A1 | 3/2016 |
| WO | 2016090315 | 6/2016 |
| WO | 2016103256 A1 | 6/2016 |
| WO | 2016137186 A1 | 9/2016 |
| WO | 2016155970 A1 | 10/2016 |
| WO | 2016181014 A1 | 11/2016 |
| WO | 2016189497 A1 | 12/2016 |
| WO | 2016196102 A1 | 12/2016 |
| WO | 2017055728 A2 | 4/2017 |

\* cited by examiner

MEDICATION DISPENSER DEPILLING MECHANISM

RELATED APPLICATIONS

This application is a United States National Phase entry of International Application No. PCT/IL2016/050398 filed Apr. 14, 2016, which claims the benefit of Israel Application No. 238387, filed on Apr. 20, 2015. The entire contents of both of the foregoing applications are hereby incorporated by reference herein.

FIELD OF THE INVENTION

The present invention relates to the field of controlled medication administration. More particularly, the present invention relates to depilling mechanisms for medication dispensers. Even more particularly the present invention relates to blister pack dosage form dispensers.

BACKGROUND OF THE INVENTION

When hospital patients are supposed to take medication they generally require a nurse or other staff member to provide the medication to them. Typically, either the patient will call the nurse or the nurse will go to the patient in order to administer the medication. The nurse must first confirm, among other things, that it is the proper time to administer the medication, that the correct dosage is present, that the patient did not receive the medication from someone else, etc. After going through the details of the patient as listed on his chart the nurse may then administer the medication.

When the medication is a controlled drug, such as a strong analgesic, government regulations specify certain protocols, including detailed record keeping and accounting of each dosage of the drugs that the hospital possesses. Thus, following the confirmation of all the prerequisites for administering a medication, if the medication is a controlled drug the nurse must then proceed to sign the drug out from its stored location and return to the patient to administer the drug.

Although some medications require the nurse to perform the actual administration, a pill may be ingested by the patient using his own faculties. Nevertheless, the nurse must still spend valuable time going from one patient to the next in order to simply hand over a pill. It is not feasible to leave a plurality of pills with the patient and allow him to ingest, for instance an analgesic pill, by himself since he may become addicted to the medication and take more pills than he is allowed.

Nurses are often busy with other activities and cannot always tend to the administration of patients' medications at the precise moment that the medication should be given. Delays in administering the medication could result in a high cost to the patient by potentially worsening the patient's condition, as well as high costs to the hospital by preventing a patient from recovering quickly, thereby requiring additional outlay of monies toward medication and other hospital upkeep for the patient.

Several prior art solutions to the above-mentioned problems have been suggested, however, they all have difficulties and drawbacks associated with them.

U.S. Pat. No. 7,896,192 to Conley et al. discloses a medication dispenser for permitting access to medication doses after a minimum dosing interval between doses. The dispenser comprises a medication tray comprising medication retention areas and blank areas. A medication dose is disposed in each retention area. A cover is disposed over the medication tray, the cover defining a dose opening through which a dose in a retention area can be accessed. A controller authenticates a person to access a medication dose. The controller further aligns the dose opening with a retention area to present a medication dose through the dose opening after the minimum dosing interval has elapsed and the person has been authenticated, and wherein the controller aligns the dose opening with a blank area between minimum dosing intervals.

In order to operate the device described in Conley et al. authorized medical personal is required to manually remove the drug from the packaging and place each dosage in the retention area prior to use. This in itself is a time consuming procedure but also has the disadvantages that the pills lay open after the removal of the protective coating of the blister pack and can be affected by humidity which can lead to moisture expansion Also there is a risk of abrasion of drugs during handling or even of partial crushing thereof. Thus, unused dosages that are left over after the patient no longer requires the drug are often considered contaminated and often must be disposed of. Alternatively, if reuse of unused pills is contemplated then regulations usually require a pharmacy on the site of usage, which pharmacy must be willing to provide a service of re-blistering of drugs after the examination of each pill for defects. Usually however this is usually not practical or legal. Besides the losses caused by the disposal of the unused dosages, proper protocol requires controlled drugs to be returned to their storage location, however, due to contamination this is not possible and proper record keeping cannot be followed.

U.S. Pat. No. 6,766,219 to Hasey discloses a medication dispensing cassette comprising a housing for enclosing at least one continuous track having a plurality of receptacles for medication, wherein each receptacle accommodates one dosage of medication. An electrical drive mechanism drives the track. A pill tray receives pills dispensed from the cassette through a pill dispensing port. A lid is attached to the housing, located above the pill tray, and is openable for removal of pills.

Hasey's device requires a unique cassette manufactured specifically for the device. This alone is undesirable as it increases costs of drug manufacturers by requiring expenditure on new machinery for producing the cassette instead of relying on the already tried and true blister pack for keeping the drug in an uncontaminated environment. Moreover, the device comprises a manual drive wheel for enabling the user to manually rotate the track. When dealing with addictive analgesic drugs it is hazardous to allow the patient to control the dispensing of the drug by himself.

DE 10236909 to Udo discloses a dispenser for pills in a blister pack, having upper and lower sections between which the blister pack is disposed. Pills are positioned such that a push button dispenses pills through apertures in the upper section. Contacts on the button and around the apertures produce a signal to change the display when a pill is dispensed.

Although the device disclosed by Udo maintains left over pills in an uncontaminated state, the device does not prevent the user from removing additional pills whenever desired. This allows a potential dangerous situation to arise, wherein the patient may overdose on the drug, similar to the manner described above regarding Hasey's device.

WO 2011023941 to Sanjeet discloses a motorized deblistering dispenser for dispensing e.g. tablets, from blister packs to a patient, having a programmable control unit for controlling the operation of dispensing platforms so that one or more items are dispensed from one or more platforms.

The object of the Sanjeet's dispenser is to provide a motorized deblistering dispenser for personal use by a patient, that is capable of dispensing deblistered items from blister packs of different sizes and configurations in predetermined doses at predetermined times. In a hospital setting, where controlled drugs are required to be monitored and recorded, Sanjeet's device would be impractical since the patient or others may access the controlled drug without permission.

US 2005/0252924 to Pieper et al. discloses an apparatus for dispensing tablets, also in the form of pills, dragees or the like, having means for holding a blister pack, means for pushing out a tablet from the blister pack and also means for setting taking times and means for displaying taking times. The invention provides for the apparatus to have a bottom part and a lid removably connected to the bottom part for holding the blister pack and also having means for pushing out the tablets from the blister pack, the arrangement of the means being matched to the arrangement of the tablets in the blister pack which is to be held.

The apparatus of Pieper et al. is a manual dispenser which would require the nurse or other hospital staff to dedicate their time at regular intervals to administering the medication to the patient. Moreover, the patient himself has the ability to control the dispensing of the drug, which is undesirable, particularly when dealing with controlled drugs, as described above.

There exists a need for a more ideal drug dispensing device, suitable for use with conventional blister packages that nonetheless provide regulated, dispensation of controlled tablets in an easy to use format.

Accordingly, it is a principal object of the present invention to provide a medication dispenser with a depilling mechanism, which overcomes the difficulties and drawbacks associated with the state of the art as described in part herein above.

It is another object of the present invention to provide a medication dispenser depilling mechanism that prevents contamination of the drug prior to reaching the patient, by leaving the drug within its original packaging until immediately prior to administering to the patient, thereby enabling storage and reuse of leftover drugs for a subsequent patient.

It is yet another object of the present invention to provide a medication dispenser depilling mechanism that prevents the patient from accessing the drug unless dispensed by the dispenser.

It is a further object of the present invention to provide a medication dispenser depilling mechanism that avoids the necessity for requiring interaction by medical staff or anyone other than the patient from the time of calibrating the device until the dosage is complete or the patient no longer needs the medication.

It is yet a further object of the present invention to provide a medication dispenser depilling mechanism that enables the controlled sequential delivery of a regimen of pills on an as-needed basis with a predetermined prescribed minimum time interval between delivery of each pill.

Additional objects and advantages of the invention will become apparent as the description proceeds.

SUMMARY OF THE INVENTION

In accordance with one embodiment of the present invention, there is provided a depilling device for a blister package comprising at least one dosage form to be dispensed, wherein each dosage form is contained within a blister formed as a covered cavity bounded by a backing, said device comprising a double action depilling mechanism, comprising a first pusher, sized and adapted to engage a top surface of said covered cavity and to exert a first sufficient force thereagainst so as to push said dosage form contained therein against its respective bounding backing, and a second pusher sized and adapted to more forcibly engage said top surface of said covered cavity and to exert a second sufficient force thereagainst so as to expel said dosage form from said blister.

In some embodiments, the depilling device for a blister package comprises at least one array of dosage forms to be dispensed.

In some embodiments, the depilling device for a blister package comprises two or more arrays of dosage forms to be dispensed.

In some embodiments, the term "depilling device" relates to a regulated, controlled mechanism for removal of unit dosage forms from blister packs containing same. Such unit dosage form contained within blister packs as herein described, for so-called "depilling" may be of any solid form, and are not limited to pills, but may comprise, inter alia, capsules, caplets, tablets, or any appropriate solid dosage form, as will be appreciated by the skilled artisan.

In some aspects, the term "depilling device" will refer to any appropriate device, regardless of the nature of the unit dosage form, as long as the same is provided within the devices of the invention, in a blister pack as herein described.

In some aspects, the depilling device suits a blister package of any type, having a series of dosage forms contained within an array of "blisters", which are covered cavities that can accommodate a dosage form located therewithin, which are bounded by a backing.

In some aspects, the blister pack is a circular arrayed blister package type, having a plurality of dosage forms placed in a concentric arrangement, and the depilling station is arranged such that the dosage forms are advanced sequentially to allow the depilling of the individual dosage forms from the concentric array.

In some aspects, the blister pack is a column and row array containing one, two or more columns and rows of dosage forms, and the depilling station is arranged such that the dosage forms are advanced sequentially to allow the depilling of the individual dosage forms from their respective location. In some aspects, the depilling station may comprise two or more depilling mechanisms to concomitantly provide for simultaneous expelling of two or more unit dosage forms located within the blisters.

It will be appreciated that the term "depilling device" refers to a device that facilitates regulated, controlled egress of a unit dosage form from its respective blister pack location and that the term refers to release of pills, capsules, caplets, tablets and any other acceptable unit dosage form.

It will be appreciated that the depilling devices of this invention are suitable for any blister package comprising at least one array of dosage forms to be dispensed.

The term "array" is to be understood as its common meaning, i.e. an ordered arrangement of the dosage forms within the package to assume a desired pattern. The depilling devices of this invention are suitable for any such arrangement.

The blister packages suitable for incorporation in the depilling mechanisms of this invention provide for one or more dosage forms contained therein, being contained within a blister formed as a covered cavity bounded by a backing.

In some aspects, the backing is flexible or penetrable. In some aspects, the backing is a foil backing. In some aspects, the backing is formed from a combination of a foil backing and a reinforcing film layer.

The depilling devices of this invention contain a double action depilling mechanism.

In some aspects, the term "double action depilling mechanism" refers to the action of two elements of the device, termed "pushers", which are structural elements whose action/actuation result in the exertion of force on the covered cavity containing the unit dosage form therewithin, by two pushers for the complete egress and release of the dosage form from its blister pack container.

In some aspects, the action of one pusher, for example, the first pusher is sufficient to substantially release the unit dosage from its blister package, and the second pusher completes the release from the blister package. In some aspects the action of one pusher, for example, the first pusher, is sufficient to create tension on the blister package, that in turn facilitates its rupture and complete release of the unit dosage form by the second pusher. In some aspects, the action of each pusher equally contributes to the complete release of the unit dosage from the blister package.

The first pusher is sized and adapted to engage a top surface of the covered cavity with which it is proximally associated. According to this aspect, the first pusher will have any appropriate geometry and dimension to suit its engagement with and impact upon a top surface of a covered cavity containing a unit dosage form.

In some aspects, the covered cavity is a domed cavity further comprising a backing, as described herein. In some embodiments, the covered cavity may be made of any suitable material and be of any suitable shape so as to enclose a dosage form therein, such as a rounded domed structure for a tablet, an oblong structure for a capsule, caplet, etc. It will be appreciated that the covered cavity may assume any convenient shape and the same is not to be considered to be limiting in any fashion.

According to this aspect, the first pusher will be comprised of materials of sufficient strength and hardness as to be capable of exerting a first sufficient force against the top surface of the covered cavity so as to push a unit dosage form contained therein against its respective bounding backing.

The second pusher is sized and adapted to engage a top surface of the covered cavity with which it is proximally associated, as well. According to this aspect, the second pusher will have any appropriate geometry and dimension to suit its engagement with and impact upon a top surface of a covered cavity containing a unit dosage form, resulting in the complete expulsion of the unit dosage form from its bounding blister package.

In some aspects, the first pusher is constructed such that the second pusher inserts therethrough, and in some embodiments, the action of the first pusher is operationally coupled with the action of the second pusher.

In some embodiments, the depilling devices of this invention are suitable for insertion of any standard blister package.

In some embodiments, when inserting a blister package having at least one array of dosage forms to be dispensed, and each dosage form is individually contained in a polymeric blister formed as a covered cavity with a foil backing, the double action depilling mechanism, comprises a first pusher sized and adapted to engage a top surface of a covered cavity of a polymeric blister exerts sufficient force thereagainst so as to push a unit dosage, e.g. a pill contained therein against its respective backing until rupture of the backing. According to this aspect, the engagement of the second pusher is more forceful such that any unit dosage/pill at least partially retained within the blister by the ruptured backing is completely released from the blister through the ruptured backing.

In some aspects, when inserting a blister package having at least one array of dosage forms to be dispensed, and each dosage form is individually contained in a polymeric blister formed as a covered cavity with a combination foil and polymer film backing, the double action depilling mechanism, comprises a first pusher sized and adapted to engage a top surface of a covered cavity of a polymeric blister and to exert sufficient force thereagainst so as to push at least one unit dosage/pill contained therein against its respective backing, and a second pusher sized and adapted to more forcibly engage the top surface of the covered polymeric blister and any dosage form at least partially retained within the blister by the backing and to force the complete release of the dosage form from the blister through the combination foil and polymer film backing.

In some aspects, the depilling mechanism is manually operated.

In some aspects, the depilling mechanism is motor driven. According to this aspect and in some embodiments, the depilling mechanism is driven by a single motor. In some embodiments, a multiplicity of first pushers operate in series with a multiplicity of second pushers, and in some aspects, each first and second pusher pair are driven by independent motors, or in some embodiments, each first and second pusher pair are driven by a single motor, or in some embodiments, each first pusher in said multiplicity is driven by a single motor and each second pusher in said multiplicity is driven by a separate single motor, or in some embodiments, each first pusher in said multiplicity and each second pusher in said multiplicity is driven by a separate single motor.

In some aspects, the first pusher, second pusher or a combination thereof is operationally connected to a release means that promotes the first sufficient force, second sufficient force or a combination thereof, resulting in release of the dosage form from the blister.

In some aspects, the release means is in the form of a reciprocating shaft, which in some aspects is tension loaded. In some aspects, the second pusher is spring loaded and is capable of a hammer action when released.

In some aspects, the second pusher applies a hammer action on a top surface of the covered cavity containing at least one dosage form of a polymeric blister. In some aspects, the hammer action promotes full release of the dosage form from the blister, facilitated by prior pressure or partial release promoted by the exertion of force thereagainst by the first pusher. In some aspects, the engagement of the first pusher exerts a first force on the blister dome which is operationally connected to spring loading of the second pusher.

In some aspects, the depilling device is provided in conjunction with a stationary depilling station for the controlled sequential delivery of a regimen of dosage forms on an as-needed basis. In some aspects, the depilling device and station will accommodate any flat multiple dosage form-containing pack, for example, as has become industry standard, or for example, as commercially available. In some aspects, the depilling device and station will accommodate a double arrayed blister package type having two columns and a plurality of rows of dosage forms to be dispensed from the blisters, which are each formed as a covered cavity with a backing. According to this aspect, the station comprises a blister pack support having two spaced-apart dosage form receiving apertures, each aperture being sized and positioned to receive dosage forms of same or different sizes, shapes and spacing in the blister pack array. According to this aspect, the depilling device may comprise a pair of motor driven, double action depilling mechanisms positioned, upon activation, to force at least one dosage form at a time from its respective blister through the backing of the blister via one of the apertures as the blister pack is advanced through the stationary depilling station. According to this aspect, each of the pair of motor driven, double action depilling mechanisms comprises a first pusher sized and adapted to engage a top surface of a covered cavity of a polymeric blister and to exert sufficient force thereagainst so as to push a dosage form contained therein against its respective backing, and a second pusher sized and adapted to more forcibly engage said top surface of said covered polymeric blister, and any dosage form at least partially retained within said blister by said backing, and to force the complete release of said dosage form from said blister through said backing.

In another aspect, the first pusher and second pusher are each operationally connected to a release means that promotes the first sufficient force and the second sufficient force, respectively and the release means are in the forms of reciprocating shafts, which are reciprocally movable along parallel axes.

In some embodiments, the first pusher and the second pusher are concentrically configured with second pusher being reciprocally movable within an opening provided in said first pusher. In some aspects, such opening may be tubular, or any other shape to accommodate the movement of the indicated pusher therethrough.

In some embodiments, the invention provides a method of depilling a blister pack, said method comprising
  a. Feeding a blister pack containing an array of dosage forms to be dispensed into a depilling device, wherein each dosage form is contained within a blister formed as a covered cavity bounded by a backing;
  b. Advancing said blister pack such that a first covered cavity is proximal to a first pusher in said depilling device, wherein said first pusher, sized and adapted to engage a top surface of said covered cavity and to exert a first sufficient force thereagainst so as to push said dosage form contained therein against its respective bounding backing; and
  c. Further advancing said blister pack such that a second pusher is engages said top surface of said covered cavity and to exert a second sufficient force thereagainst expelling said dosage form from said blister.

To accomplish the above and related objects, the invention may be embodied in the form illustrated in the accompanying drawings. With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description taken with the attached figures making apparent to those skilled in the art how the several forms of the invention may be embodied in practice.

DETAILED DESCRIPTION OF THE
PREFERRED EMBODIMENTS

This invention provides a depilling device for a blister package, which can accommodate a single pill or one or more arrays of dosage forms to be dispensed, with each dosage form being contained within a blister formed as a covered cavity bounded by a backing. Unique aspects of the depilling device include the presence of a double action depilling mechanism, comprising a first pusher, sized and adapted to engage a top surface of a covered cavity of the blister pack and to exert a first sufficient force thereagainst so as to push a dosage form contained therein against its respective bounding backing, and a second pusher sized and adapted to more forcibly engage the top surface of the covered cavity and to exert a second sufficient force thereagainst so as to expel the dosage form from the blister.

Figure 1A:
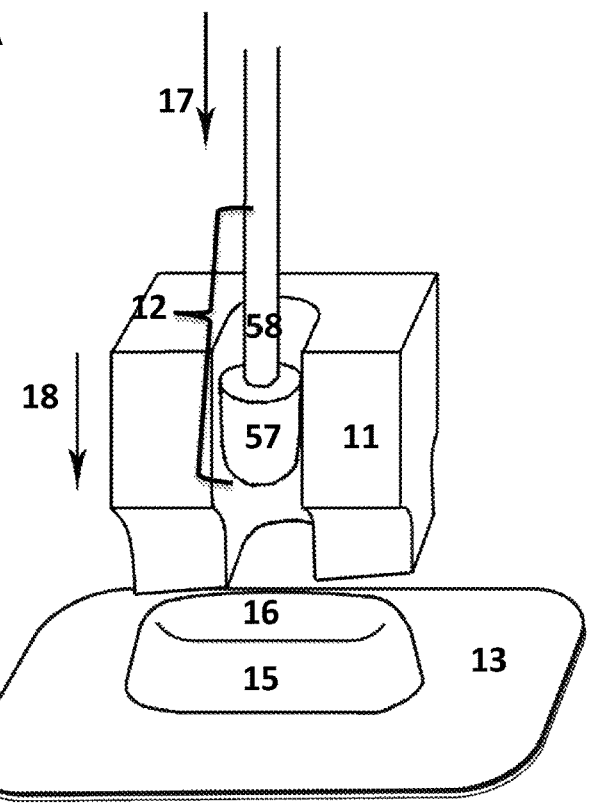
FIGS. 1A and 1B show embodied elements of embodied depilling devices of this invention in cross-section. The First pusher 11 is sized and adapted to engage a top surface 16 of a covered cavity 15 and to exert a first sufficient force thereagainst. The second pusher 12 sized and adapted to more forcibly engage the top surface of said covered cavity and to exert a second sufficient force thereagainst is depicted. The direction 18 of applied force of the first pusher 11 and the direction 17 of the second pusher 12 is shown. The blister package 13 orientation to position the first and second pusher proximally to the blister containing a unit dosage form is evident. A blister pack with a single pill (1A) or a single column array of pills (1B) is shown.
Figure 1B:
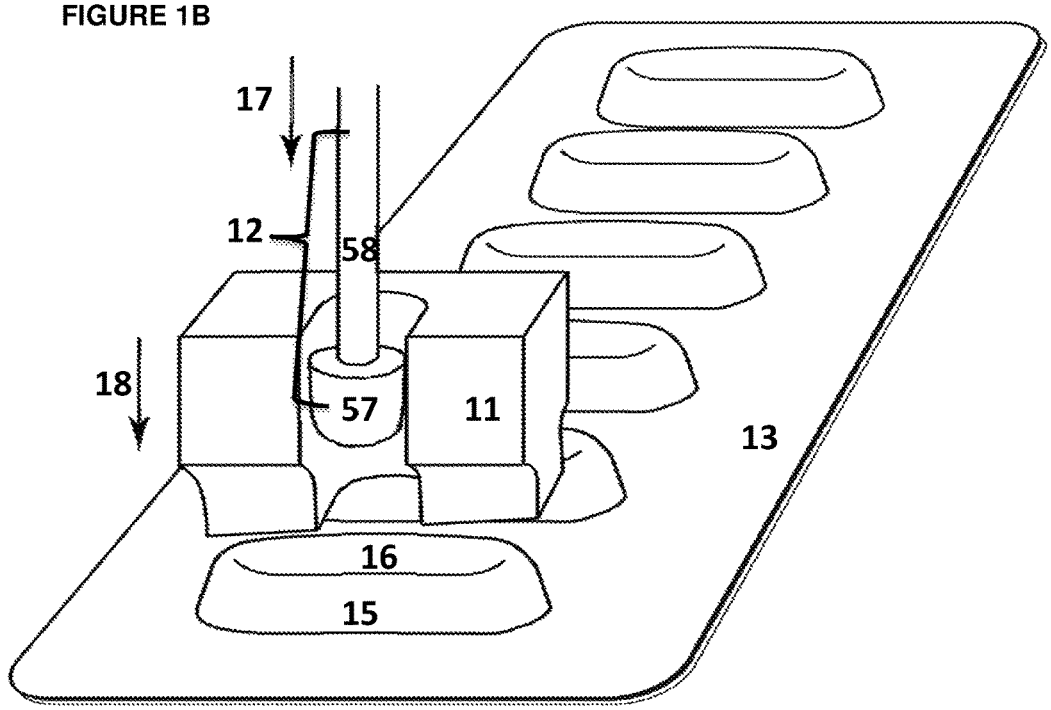

Referring now to FIGS. 1A and 1B, in which embodied elements of a depilling device of the invention is shown, a blister pack 13 with a single dosage form or single column array of unit dosage forms arranged are depicted, where the unit dosage forms are contained in a respective cavity 15 with a covered region 16. The depilling device engages the blister package in the direction marked by element 18 in the figure. The depilling device comprises a first pusher, depicted in the figure as element 11, and a second pusher, depicted in the figure as element 12, where there structural arrangement is coupled to promote first engagement by the first pusher followed by second engagement of the covered cavity by the second pusher.

In this aspect, the second pusher is comprised of at least two parts, an elongated shaft 58 and a striker element 57.

It will be appreciated that the depiction is for exemplification purposes and other geometries of the first and second pusher are readily envisioned.

Figure 1C:
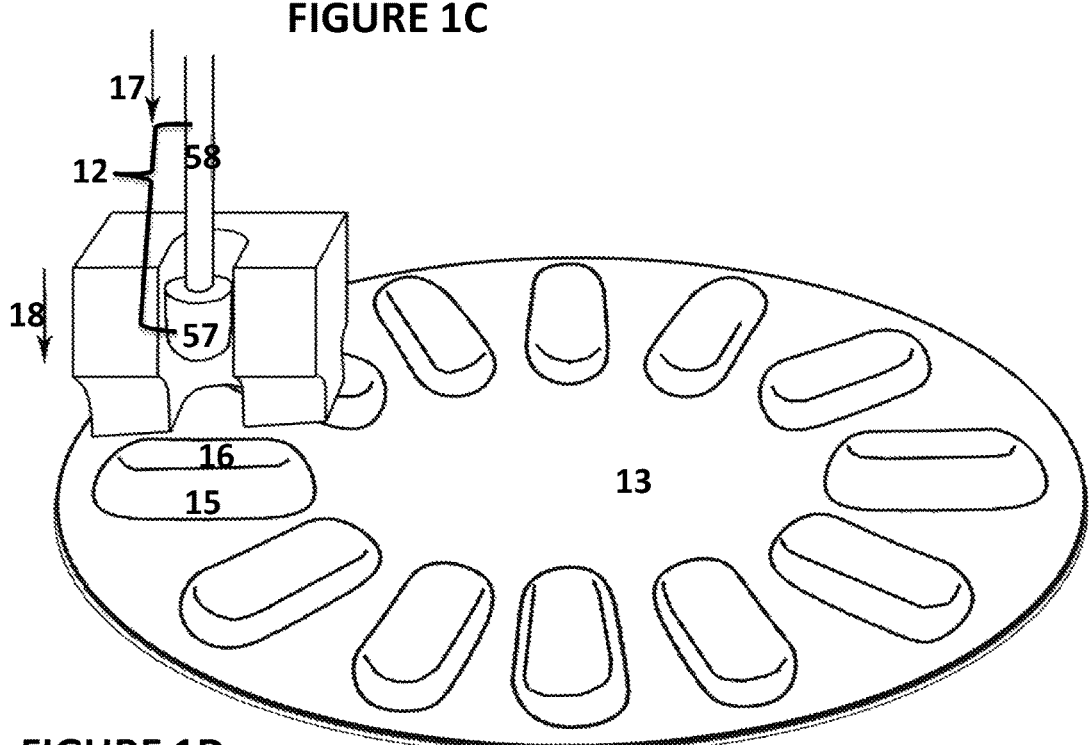
FIG. 1C shows elements of another embodied depilling device of this invention in cross-section, where the device is sized and adapted to release unit dosage forms from a circular array 19 blister pack containing same.

Referring now to FIG. 1C, in which embodied elements of a depilling device of the invention is shown, a blister pack 13 with a single array of unit dosage forms arranged in a circular pattern is depicted and each dosage forms is contained in a respective cavity 15 with a covered region 16. Other elements of the depilling device are comparable to counterpart elements depicted in FIG. 1A, 1B.

Figure 1D:
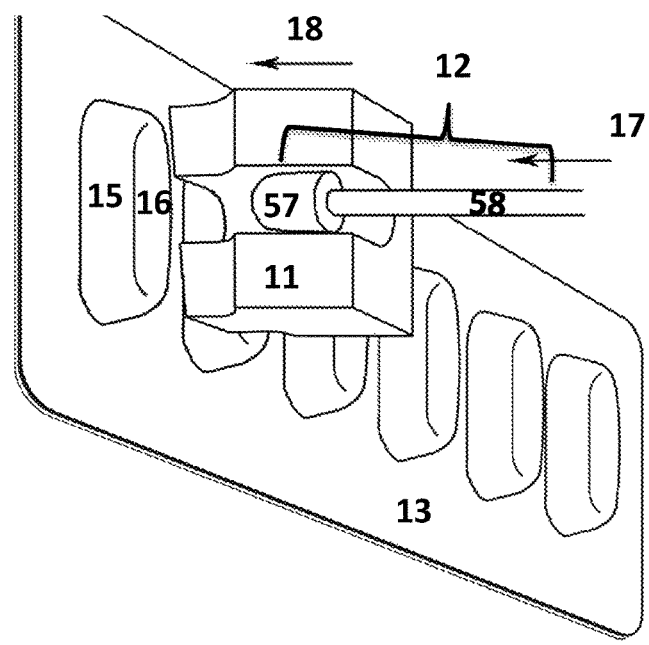
FIG. 1D shows elements of another embodied depilling device of this invention in cross-section, where the blister is arranged such that the pushers are oriented to apply force horizontally, as opposed to vertically in order to release the dosage form contained therein.

FIG. 1D shows elements of another embodied depilling device of this invention in cross-section, where the blister is arranged such that the pushers are oriented to apply force horizontally, as opposed to vertically in order to release the dosage form contained therein. Other elements of the depilling device are comparable to counterpart elements depicted in FIG. 1A, 1B and it will be apparent to the skilled artisan that the depilling devices of this invention may comprise rotation of various elements in order to accommodate different sized, shaped blister packs, or in some embodiments, different orientations of such blister packs therein, all of which are to be considered as part of this invention.

It will be appreciated that numerous blister packages are available commercially and a feature of the devices and methods of this invention is their suitability for application using readily available blister packages and dosage forms already packaged therein.

In some aspects, the elements of the depilling device may be comprised of any appropriate material, such as metals or metal alloys or metal composites, polymers, plastics, resins, and others. In some aspects, mixtures of elements may be readily used for the construction of any of the stated parts of the device or parts of the specified elements in the device. For example, and in one embodiment, with respect to the second pusher of this invention, the shaft element 58 and striker element 57 may be comprised of the same or different materials. In some aspects, the striker element 57 may be comprised of a material with significantly greater hardness than the shaft, or vice versa. In some aspects, the striker element may be comprised of a plastic, whereas the shaft may be comprised of a metal part, or vice versa.

The invention is not to be limited in terms of the composition of the elements of the pushers as described herein.

Figure 2:
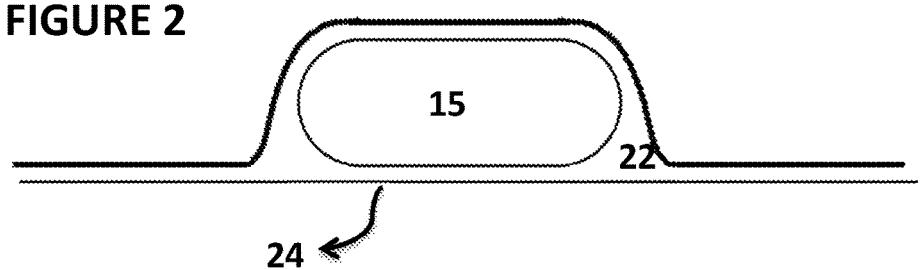
FIG. 2 shows a cross section of an embodied blister pack 13 containing a covered cavity 22 in which a unit dosage 15 is contained. The blister is bounded by a single layer backing 24, such as a foil backing.
Figure 3:
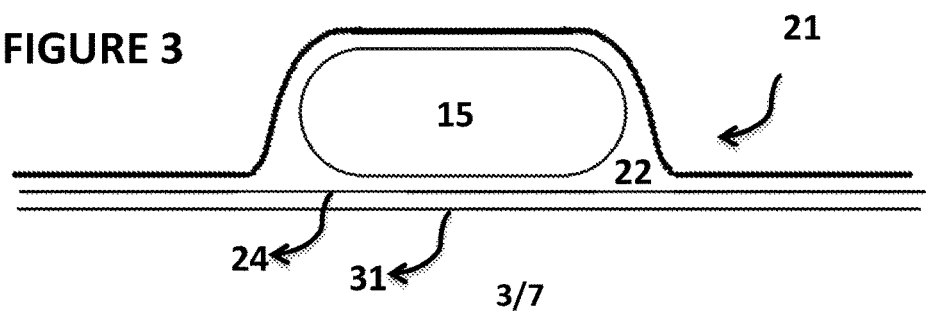
FIG. 3 shows a cross section of an embodied blister pack 21 containing a covered cavity 22 in which a unit dosage 15 is contained. The blister is bounded by a double layer backing, having a first layer 24, which for example is a foil backing; and a second layer 31, which is a strengthening layer, for example, a polymer film.

FIGS. 2 and 3 depict embodiments of blister packages, highlighting the nature of the backing of same, whereby depilling the unit dosage form located therein can be readily accomplished in a controlled manner via the devices and methods of this invention.

In FIG. 2, a unit dosage form 15 is located in a blister package 13, inside the covered cavity 22, which is bounded by a single layer backing 24.

In some aspects, the single layer backing will be any conventional backing, such as a thin foil, thin paper or other appropriate backing.

In FIG. 3, a unit dosage form 15 is located in a blister package 21, inside the covered cavity 22, which is bounded by a multi-layer backing. In some aspects, the multi-layer backing is comprised of 2 layers, an inner layer 24 and an outer layer 31, so termed based on their relative positioning with respect to the outer packaging surface.

In some aspects, the inner layer may be comprised of the same materials as the single layer as depicted in FIG. 2. In some aspects, the inner layer may be thinner or comprise a coating on the outer layer.

In some aspects, the backing, whether in single layer, multi-layer or both, is flexible or penetrable. In some aspects, the backing is a foil backing and in some embodiments, the backing is formed from a combination of a foil backing and a reinforcing film layer.

In some aspects, the blister packages for use with the devices and methods of this invention could contain one or more unit dosage forms therein, and same can comprise any suitable form, such as a tablet, capsule, caplet, suppository, pessary, gelcap and others, as will be appreciated by the skilled artisan.

It is to be understood that while a specific blister in a blister pack normally and preferably contains only one dosage form to be dispensed, it is possible to prepare blister packs with more than one dosage form and/or more than one type of dosage form per blister when a regimen of providing two or more dosage forms simultaneously is prescribed.

It is to be understood that the invention contemplates a single blister pack being dispensed containing one or more dosage forms within the single blister pack, or in other embodiments, a single column array of blisters, with each blister containing one or more dosage forms in each blister, or in some embodiments, a single array of blisters in other patterns, for example, a circular array of blisters, with each blister containing one or more dosage forms in each blister, or in some embodiments, an array of two or more columns, or two or more rows, or a combination thereof, of blisters, with each blister containing one or more dosage forms in each blister, and other arrays, as will be appreciated by the skilled artisan. The invention is not to be limited in terms of the arrays that may be introduced, or the number of dosage forms included in each blister of the arrays suitable for use with the depilling devices of this invention.

Figure 4:
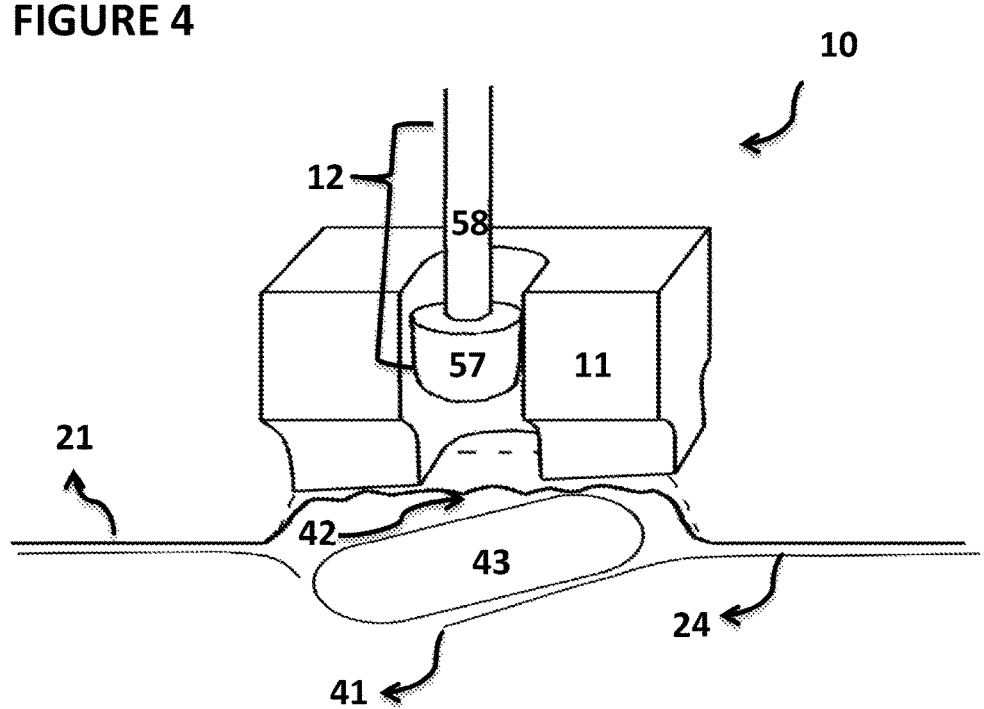
FIG. 4 shows a cross sectional view of embodied elements of an embodied depilling device 10 of this invention in cross-section, detailing engagement of a first pusher 11 with the top surface of a covered cavity to exert a first sufficient force which deforms the dome structure 42. As a result of this first applied force, a rupture 41 in the bounding backing 24 is created, which promotes partial egress of the unit dosage form 43 contained therein.

FIG. 4 depicts the engagement of the first pusher 11 with the covered cavity of the blister package and the impact on the covered cavity 42, in terms of deformation of same. As a result of the first applied force, a rupture 41 in the bounding backing 24 is created, which promotes partial egress of the unit dosage form 43 contained therein, for example, when the bounding backing is a single layer flexible, penetrable backing. The relative positioning of the second pusher 12 is shown, whereby the second pusher has not yet engaged the covered cavity. In this aspect, the unit dosage form 43 is partially liberated from the packaging, in that an opening 41 in the backing has been created, however, the dosage form is not yet fully released from the blister package.

Figure 5A:
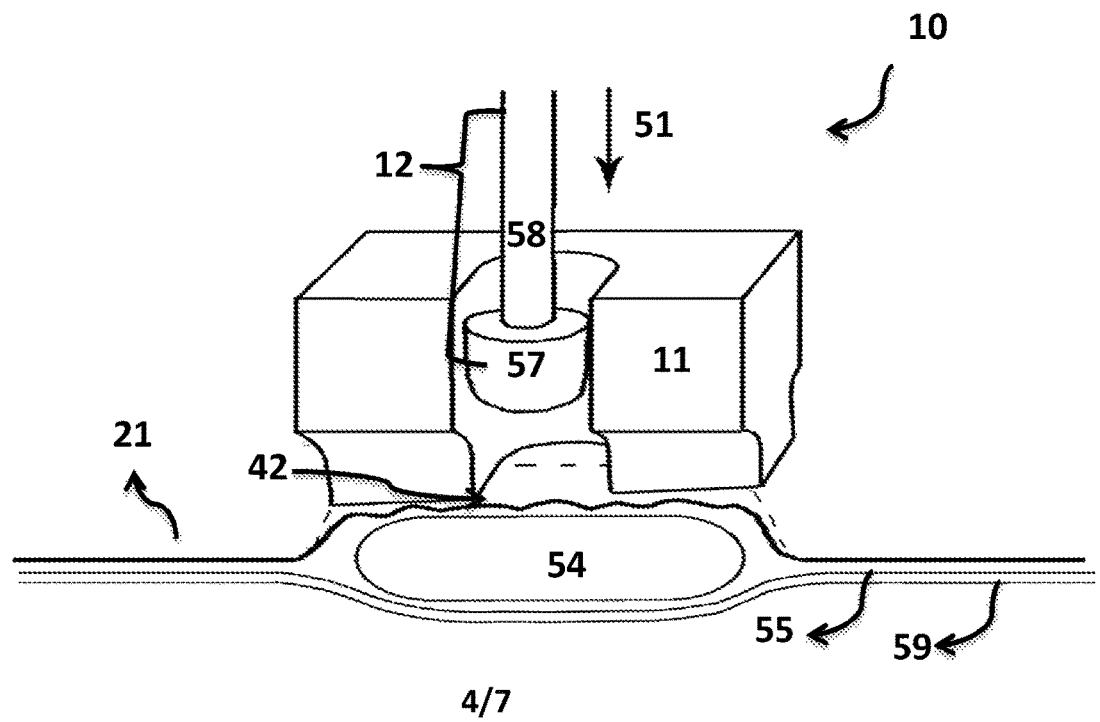
FIG. 5a shows a cross sectional view of embodied elements of an embodied depilling device 10 of this invention in cross-section, detailing engagement of a first pusher 11 with the top surface of a covered cavity to exert a first sufficient force which places the dome structure 42 under tension. The direction of applied force is shown 51. The unit dosage form 54 is located in a blister pack with a strengthened backing 55 of two layers a proximal layer 55 and distal layer 59. Positioning of the second pusher 12 with respect to the first pusher 11 is shown, as well.

FIG. 5a depicts the engagement of the first pusher 11 with the covered cavity of the blister package and the impact on the covered cavity 42, in terms of deformation of same, similar to that seen in FIG. 4. According to this aspect, the bounding backing of the blister package 21 however, is comprised of two layers, an inner layer 55 and an outer layer 59. In this depicted aspect, the engagement of the first pusher 11 with the covered cavity does result in some deformation of same 42, however the backing has not yet ruptured and the dosage form 54 is still fully contained within the blister package.

As will be apparent to the skilled artisan, the engagement of the first pusher with the covered cavity of the blister pack will place the contents of same under tension/pressure, which is insufficient, in some aspects to pierce the double backing.

Figure 5B:
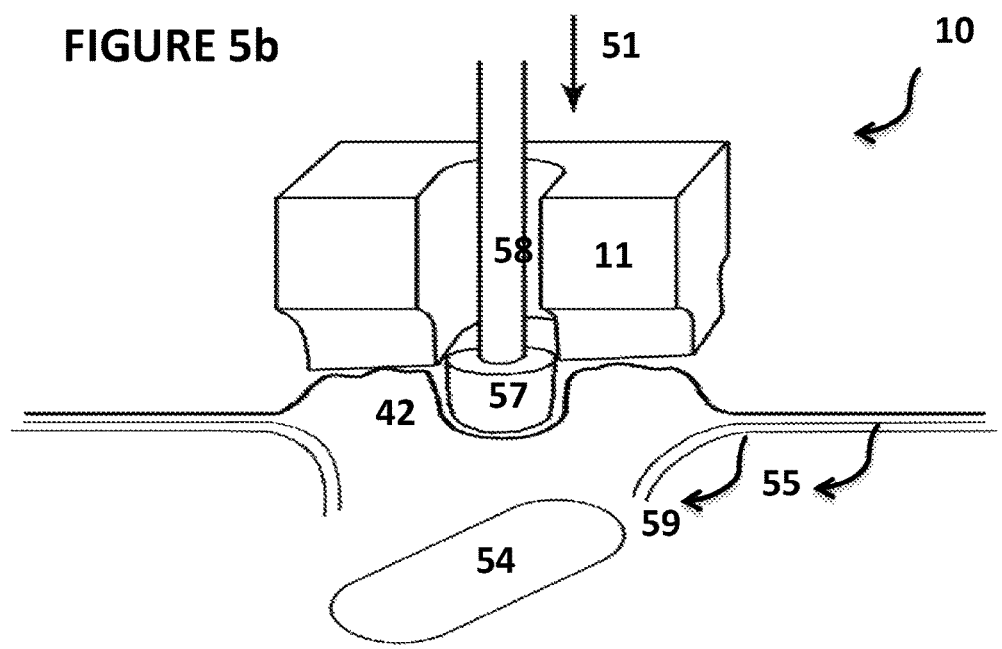
FIG. 5b shows a cross sectional view of the embodied depilling device in FIG. 5a, detailing further engagement of the proximal end 57 of the second pusher 12 with the top surface of the covered cavity under pressure 42, further deforming the surface. The unit dosage form 54 in turn, is now completely released from the tensioned backing 55.

FIG. 5b depicts engagement of the second pusher which in some aspects, is with greater applied force, or in some aspects, is of a magnitude/strength to expel the dosage form 54 from the blister. In this aspect, the further engagement of the proximal end 57 of the second pusher 12 with the top surface of the covered cavity under pressure 42, further deforms the surface and results in the unit dosage form 54 in turn, being completely released from the tensioned backing.

In some aspects of the invention, the depilling devices facilitate egress of the dosage form from a blister pack in a controlled and automated manner.

According to this aspect, and in some embodiments, the first pusher, second pusher or a combination thereof is operationally connected to a release means that promotes or facilitates creation of the first sufficient force, second sufficient force or a combination thereof, resulting in release of the dosage form from the blister.

Figure 6A:
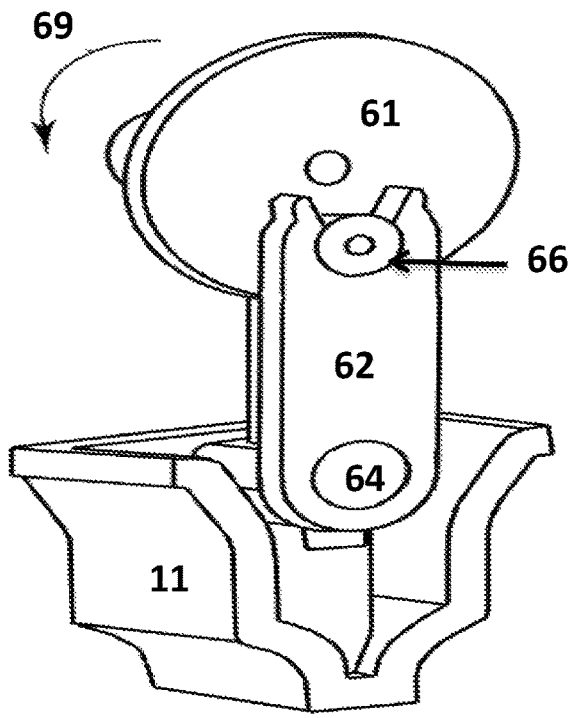
FIG. 6a shows a cross section of a reciprocating crank shaft 61 and a linking shaft 62, which facilitates the first pusher 11 engaging the blister pack. The arrangement promotes alternation between a pressurized and relaxed state, as the reciprocating crank shaft is revolved around the indicated axis in the direction of movement indicated by 63.
Figure 6B:
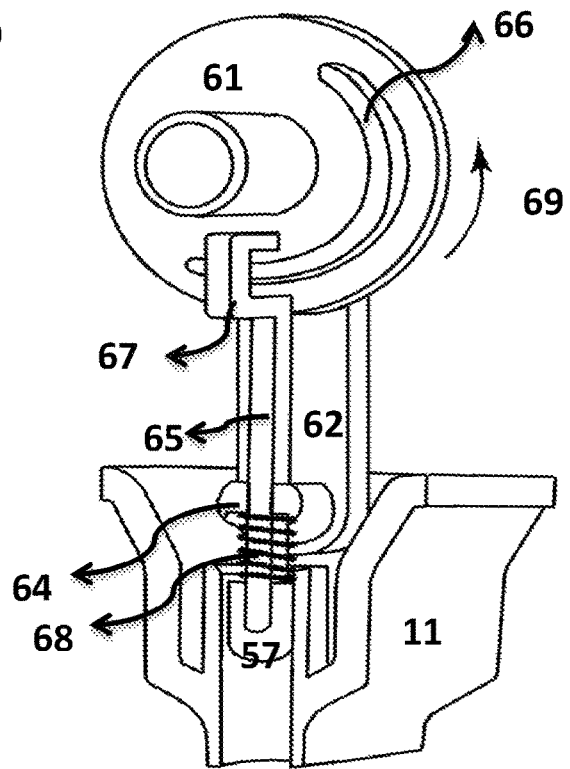
FIG. 6b shows a cross section of a reciprocating crank shaft 61 and a linking shaft 62, showing 180 degree view of that shown in FIG. 61. The reciprocating crank shaft 61 has a tensioner part 66, which is engaged by a latching part 67 of the shaft 65 of the second pusher 12. When the reciprocating crank shaft 61 is rotated about the axis in the direction as shown in 69, for at least half of the revolution length of the crank shaft, the tensioner is latched via the latching part 67, which in turn causes tensioning of the spring 68, which is positioned over the shaft 58 of the second pusher 12, between the tamper 57 and the stabilizer pin 64.

FIGS. 6a and 6b exemplify such controlled regulation at the level of the coordinated activity of the first and second pusher, as accomplished via the incorporation of a reciprocating crank shaft 61 in the device. Such reciprocating crank shaft 61 may be attached to a linking shaft 62, via respective and appropriate connectors 65 and 64. Such connectors, for example, may be simple pins or lateral extensions, facilitating joining of the respective parts for the coupled activity of same, as illustrated and described herein.

The relative positioning of the reciprocating crank shaft assembly vis a vis the first pusher 11 is shown in FIG. 6a, as well.

Rotation of the assembly in FIG. 6a about a horizontal axis is shown in FIG. 6b.

According to this aspect, and in one embodiment, there is provided a linking shaft 62, which participates in coordinated activity with the reciprocating crank shaft 61 via further partial engagement of the tensioner part 66 during a portion of the full rotation of the reciprocating crank shaft 61. In some aspects, such arrangement promotes alternation between a pressurized and relaxed state, as the reciprocating crank shaft is revolved around the indicated axis in the direction of movement indicated by 69.

According to this aspect, the tensioner part 66 of the reciprocating crank shaft 61 is engaged by a latching part 67 of the shaft 65 of the second pusher. When the reciprocating crank shaft 61 is rotated about the axis in the direction as shown in 69, for at least a partial revolution length of the crank shaft, the tensioner is latched via the latching part 67, which in turn causes tensioning of the spring 68, which is positioned over the shaft 58 of the second pusher 12, between the proximal end 57, which functions as a tamper, and the stabilizer pin 64.

It will be appreciated that even extremely discreet minor fractional rotation of the reciprocating crank shaft 61 about the axis in the direction, e.g. as shown by 69 will facilitate latching and unlatching of the tensioner to actuate the pushers as described and the invention is not to be limited by the length of such partial revolution. In some embodiments, such revolution may be at least a quarter, or in some embodiments, at least a half, or in some embodiments, at least three quarters of a revolution, or in some embodiments, such revolution may be at least a tenth to at least a quarter-length revolution.

Figure 7:
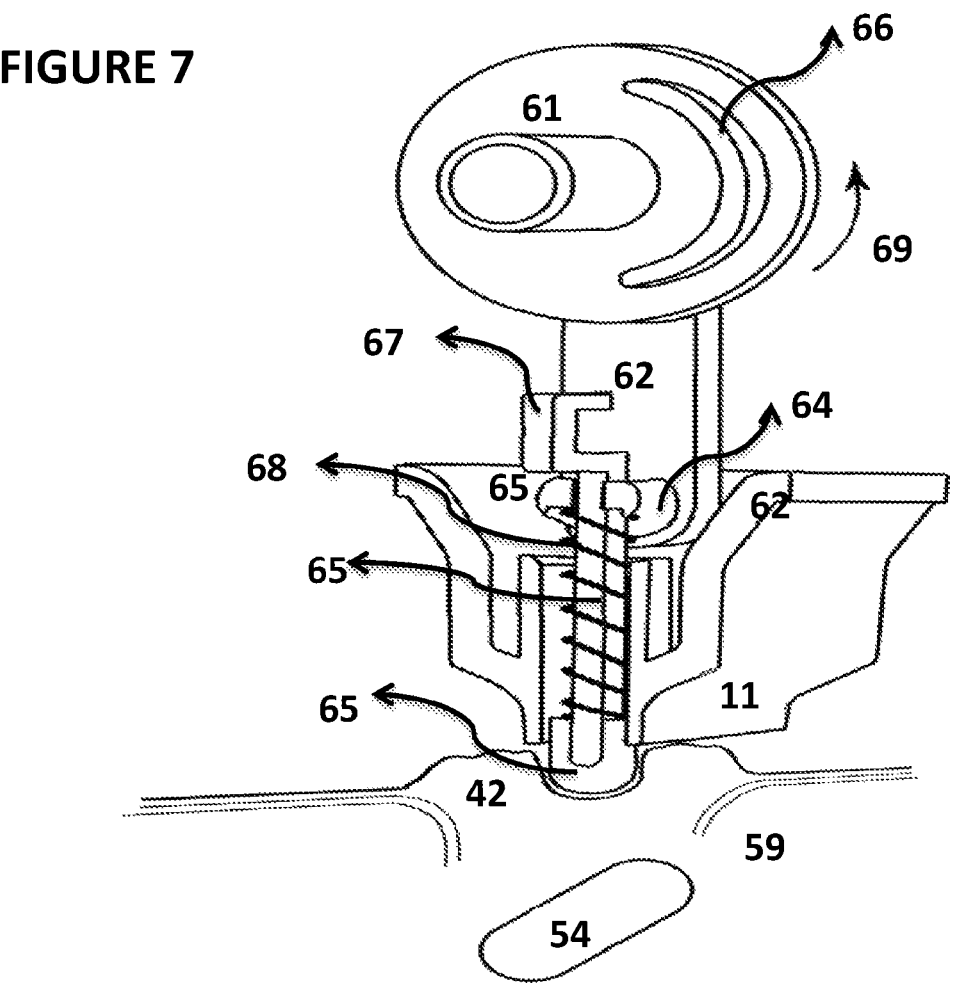
FIG. 7 shows a similar cross-sectional view to that shown in FIG. 6b, however, in this aspect, when the reciprocating crank shaft 61 is further rotated about the axis in the direction as shown in 69, from that shown in FIG. 6b, for at least the second half of the revolution length of the crank shaft, the tensioner is no longer latched via the latching part 67, which in turn causes relaxation/release of the spring 68, as the shaft 58 of the second pusher 12 is propelled downward, until the latching part 67 abuts the stabilizer pin 64.

FIG. 7 further extends the coordinated activity of the elements of the depilling device, now showing uncoupling of the reciprocating crank shaft and latching part, when the reciprocating crank shaft 61 is further rotated about the axis in the direction as shown in 69, from that shown in FIG. 6b.

In this aspect, for at least the second half of the revolution length of the crank shaft, the tensioner 66 is no longer latched via the latching part 67, which in turn causes relaxation/release of the spring 68, as the shaft 58 of the second pusher 12 is propelled downward, until the latching part 67 abuts the stabilizer pin 64. As depicted, this enables propulsion of the second pusher toward the covered cavity to further deform same and promote full release of the unit dosage form 54 from the backing of the blister package.

In some aspects, as will be readily appreciated by the skilled artisan, a reciprocating crank shaft may as well regulate engagement of the first pusher with the blister package as well as with the engagement of the second pusher. In some aspects a single reciprocating crank shaft may control the engagement of both the first pusher and second pusher, for example via the revolution around a tensioner or series of tensioners, the rotation around wish, and respective tensioning and relaxation of the respective controllers resulting in engagement of the first pusher and/or second pusher with the blister pack being regulated by for example, motors and appropriate circuitry to regulate engagement of same.

In some aspects, different motors may regulate engagement of the first pusher and second pusher, for example by engaging different reciprocating crank shafts operationally connected to each.

In some aspects, engagement of the first pusher may be via a switch and relay system that in turn initiates rotation of the reciprocating crank shaft operationally connected to the second pusher.

The skilled artisan will readily appreciate that the reciprocating crank shaft may be comprised of any suitable material, and may comprise a plastic, resin, polymer, or other suitable material. In some aspects, such assembly may be constructed as a single piece, for example, via use of appropriate molds and known processes for preparing same. In other embodiments, individual parts may be suitable attached and in some embodiments, lithography or three-dimensional printing of parts is envisioned, as well.

It will be apparent to the skilled artisan that the depilling devices of this invention may be further coupled to automating elements, for example, via the attachment of suitable motors or appropriate manual controls.

Figure 8:
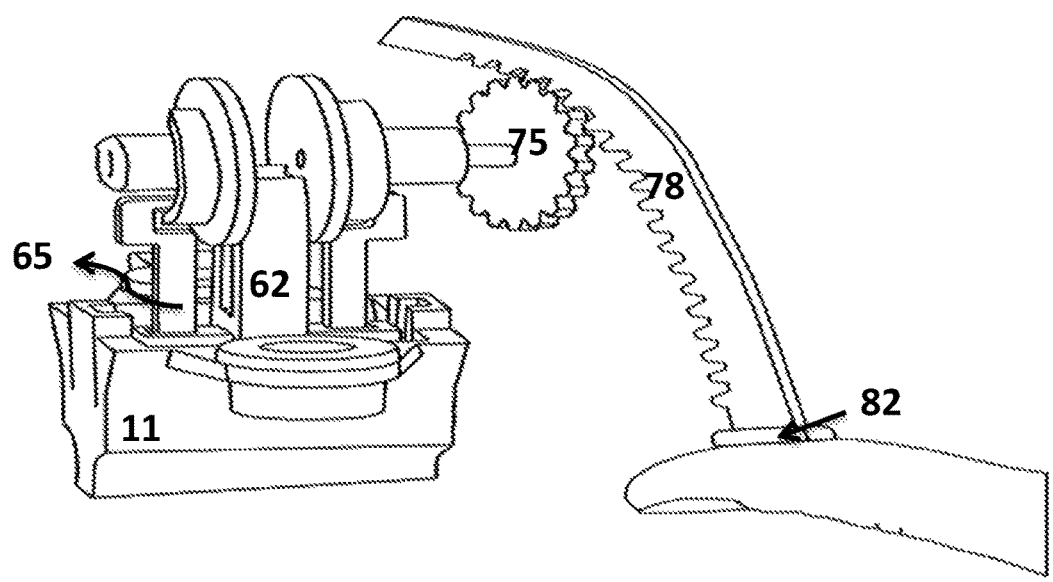
FIG. 8 shows a side perspective view of the depilling device depicted in FIG. 6b, rotated 90 degrees from that shown in FIG. 6b, illustrating the potential for attachment of a manually operated device. In this aspect, a rotating gear 75 engages a reciprocating geared lever 78, which is activated by, for example, a push switch 82 or any other appropriate structure to actuate the reciprocating crank shaft and tensioner mechanism.

FIG. 8 shows a side perspective view of the depilling device depicted in FIG. 6b, rotated 90 degrees from that shown in FIG. 6b, illustrating the potential for manual operation of the device. In this aspect, a rotating gear 75 engages a reciprocating geared element or lever 78, which can be advanced/engaged via a push button mechanism 82, as depicted. It will be appreciated by the skilled artisan that any number of mechanisms for manual operation are envisioned that allow for the actuation of the first and second pusher mechanisms as described.

Figure 9:
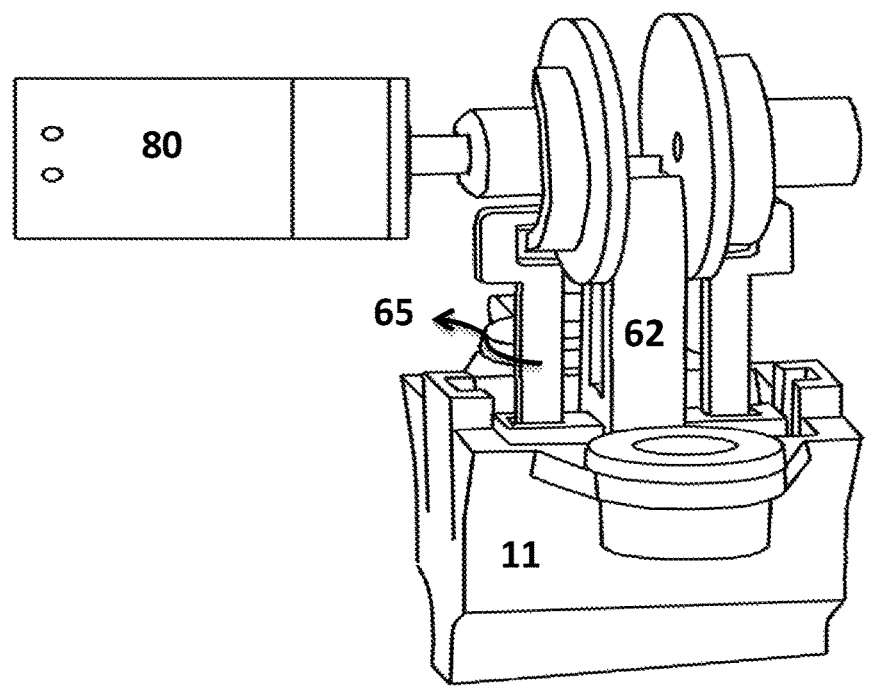
FIG. 9 shows a side perspective view of the depilling device depicted in FIG. 6b, rotated 90 degrees from that shown in FIG. 6b, illustrating the potential for attachment of a motor 80 to the reciprocating crank shaft 61.

FIG. 9 shows a side perspective view of the depilling device depicted in FIG. 6b, rotated 90 degrees from that shown in FIG. 6b, illustrating the potential for attachment of a motor 80 to the reciprocating crank shaft 61.

In some aspects a single motor may be coupled to multiple reciprocating crank shafts in a device of this invention, or in some embodiments, multiple motors may be coupled to multiple reciprocating crank shafts in a device of this invention.

Figure 10:
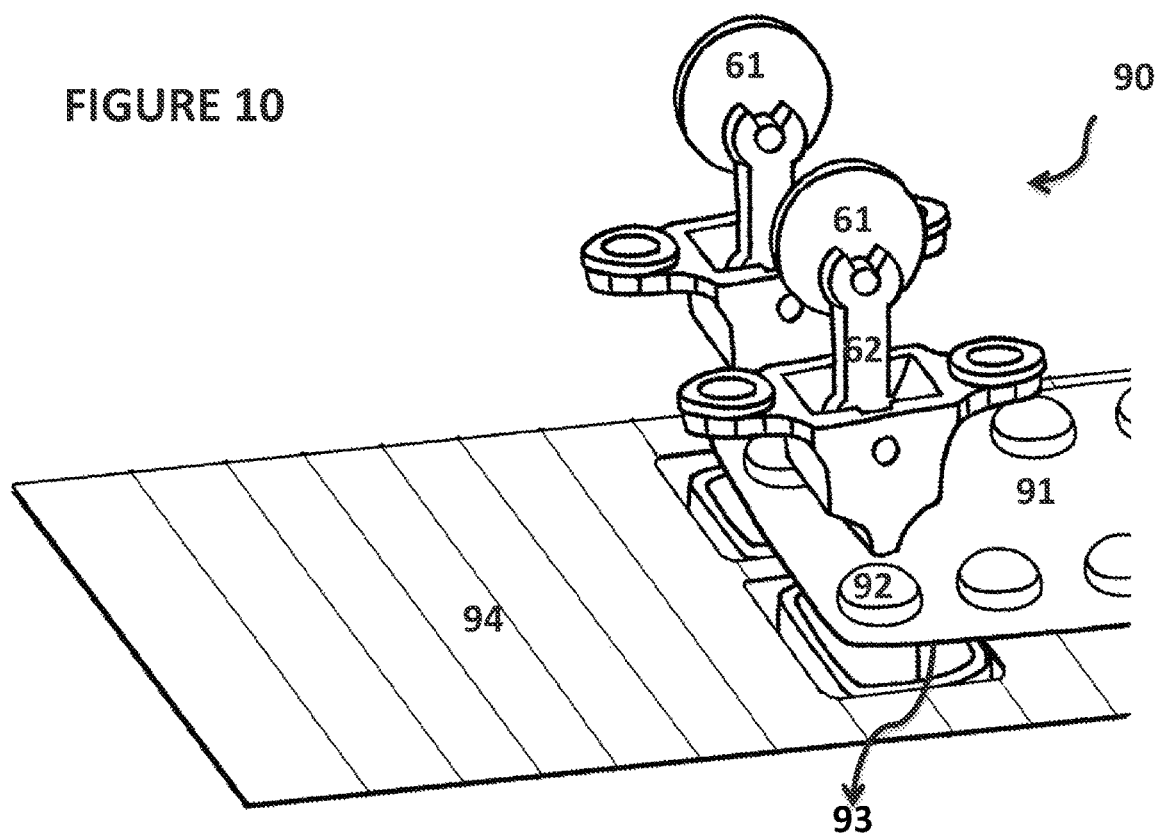
FIG. 10 shows a depilling device comprising two depilling stations 90 and 91, respectively, and their relative positioning with respect to a blister pack 94 containing two columns 92 of spaced unit dosage forms and the relative positioning of dosage form receiving apertures 93 through which the released unit dosage form is ejected.

FIG. 10 further depicts the potential to further automate the depilling devices of this invention by, for example, coupling two or more depilling stations 90 and 91, respectively. The relative positioning of such stations with respect to a blister pack 94 containing two columns 92 of spaced unit dosage forms and the relative positioning of dosage form receiving apertures 93 through which the released unit dosage forms are ejected are exemplified, but the skilled artisan will readily appreciate the obvious potential alternate geometries and orientations which would be suitable, as well.

Figure 11:
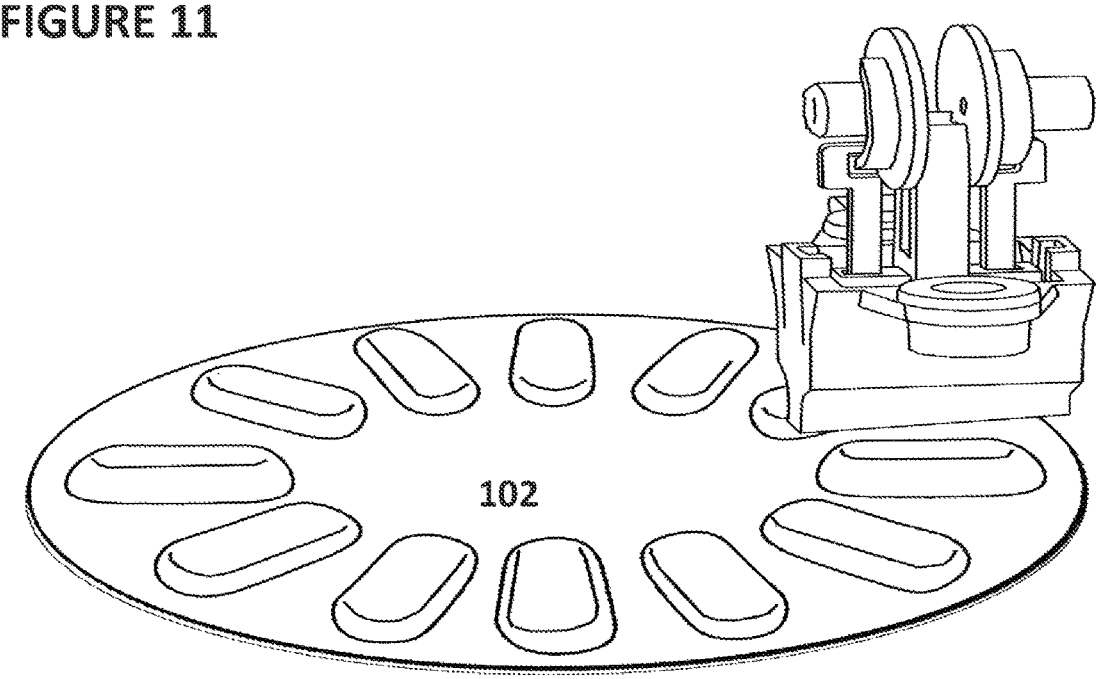
FIG. 11 shows positioning of the depilling device shown in FIG. 9, as positioned over a circular blister pack array 102.

FIG. 11 further depicts the versatility of the platform provided by the devices and methods of this invention. In this aspect, the positioning of the depilling device shown in FIG. 9, is changed to accomodate a circular blister pack array 102.

It is understood that the above description of the embodiments of the present invention are for illustrative purposes only, and is not meant to be exhaustive or to limit the invention to the precise form or forms disclosed, as many modifications and variations are possible. Such modifications and variations are intended to be included within the scope of the present invention as defined by the accompanying claims.

What is claimed is:

1. A depilling device for a blister package comprising at least one dosage form to be dispensed, wherein:
   said at least one dosage form is contained within a blister formed as a covered cavity bounded by a backing; and
   said device comprises a double action depilling mechanism, comprising:
   a first pusher, sized and adapted to engage a top surface of said covered cavity and to exert a first sufficient force thereagainst so as to push said dosage form contained therein against its respective backing; and
   a second pusher sized and adapted to more forcibly engage said top surface of said covered cavity and to exert a second sufficient force thereagainst so as to expel said dosage form from said blister,
   wherein said first pusher, said second pusher or a combination thereof is operationally connected to a release means that promotes said first sufficient force, said second sufficient force or a combination thereof, resulting in release of said dosage form from said blister.

2. A depilling device according to claim 1 wherein said depilling device is adapted for depilling of an array of dosage forms to be dispensed, optionally wherein each dosage form is contained within a blister formed as a covered cavity bounded by a backing.

3. A depilling device according to claim 1 wherein said second sufficient force is of greater magnitude than said first sufficient force.

4. A depilling device according to claim 1 wherein said backing is flexible or penetrable.

5. A depilling device according to claim 1 wherein said backing is a foil backing.

6. A depilling device according to claim 1 wherein said backing is formed from a combination of a foil backing and a reinforcing film layer.

7. A depilling device according to claim 1, for a standard blister package of the type having at least one array of dosage forms to be dispensed, wherein said blister is a polymeric blister said backing is a foil backing, and said first pusher is sized and adapted to engage said top surface to exert said first sufficient force thereagainst so as to push said dosage form against its respective backing until rupture thereof, and said second pusher is sized and adapted to more forcibly engage said top surface and any dosage form at least partially retained within said blister by said ruptured backing and to force the complete release of said dosage form from said blister through said ruptured backing.

8. A depilling device according to claim 1, for a standard blister package of the type having at least one array of dosage forms to be dispensed, wherein said blister is a polymeric blister and said backing is a combination foil and polymer film backing, and said first pusher is sized and adapted to engage said top surface to exert said first sufficient force thereagainst so as to push said at least one dosage form against its respective backing, and said second pusher is sized and adapted to more forcibly engage said top surface and any dosage form at least partially retained within said blister by said backing and to force the complete release of said dosage form from said blister through said combination foil and polymer film backing.

9. A depilliing device according to claim 1 where said depilling mechanism is manually operated.

10. A depilliing device according to claim 1 where said depilling mechanism is motor driven, optionally where said depilling mechanism is driven by a single motor.

11. A depilling device according to claim 1 wherein said second pusher is spring loaded and capable of a hammer action when released and wherein said second pusher applies said hammer action on said top surface of said covered cavity containing at least one dosage form of said blister and wherein said hammer action promotes full release of said dosage form from said blister, facilitated by prior pressure or partial release promoted by the exertion of force thereagainst by said first pusher.

12. A depilling device according to claim 1 wherein engagement of said first pusher exerts a first force on said top surface which is operationally connected to spring loading of said second pusher.

13. A depilling device according to claim 1 provided in conjunction with a stationary depilling station for the controlled sequential delivery of a regimen of dosage forms on an as-needed basis, from any standard commercial flat multiple dosage form-containing pack of the double arrayed blister package type having two columns and a plurality of rows of dosage forms to be dispensed from said blisters, which are each formed as a covered cavity with a backing, said station comprising a blister pack support having two spaced-apart dosage form receiving apertures, each aperture being sized and positioned to receive dosage forms of same or different sizes, shapes and spacing in said blister pack array; wherein said depilling device comprises a pair of said double action depilling mechanisms positioned, upon activation, to force at least one dosage form at a time from its respective blister through the backing of said blister via one of said apertures as said blister pack is advanced through said stationary depilling station, each of said pair being motor driven.

14. A depilling device according to claim 1 wherein said release means are in the forms of a reciprocating shafts, which are reciprocally movable along parallel axes.

15. A depilling device according to claim 1 provided in conjunction with a depilling station for the controlled sequential delivery of a regimen of dosage forms, from a circular blister package type having at least one single circular array of dosage forms to be dispensed from said blister.

16. A depilling device according to claim 1 provided in conjunction with a depilling station for the controlled sequential delivery of a regimen of dosage forms, from a circular blister package type having at least one single circular array of dosage forms to be dispensed from said blister, said device sized to be mobile and fit into a hand bag or pocket.

17. A depilling device according to claim 1 provided in conjunction with a depilling station for the controlled sequential delivery of a regimen of dosage forms, from a circular blister package type having at least one single circular array of dosage forms to be dispensed from said blister, said device sized having an outlet to deliver the at least one dosage form into a container.

18. A depilling device according to claim 1 provided in conjunction with a depilling station for the controlled sequential delivery of a regimen of dosage forms, from a circular blister package type having at least one single circular array of dosage forms to be dispensed from said blister, said device sized having an outlet to deliver the at least one dosage form directly into a mouth.

19. A depilling device for a blister package comprising at least one dosage form to be dispensed, wherein:
said at least one dosage form is contained within a blister formed as a covered cavity bounded by a backing; and
said device comprises a double action depilling mechanism, comprising:
a first pusher, sized and adapted to engage a top surface of said covered cavity and to exert a first sufficient force thereagainst so as to push said dosage form contained therein against its respective bounding backing; and
a second pusher sized and adapted to more forcibly engage said top surface of said covered cavity and to exert a second sufficient force thereagainst so as to expel said dosage form from said blister,
wherein said first pusher and said second pusher are concentrically configured with said second pusher being reciprocally movable within a tubular opening provided in said first pusher.

* * * * *